United States Patent
Wang

(10) Patent No.: US 11,960,674 B2
(45) Date of Patent: Apr. 16, 2024

(54) DISPLAY METHOD AND DISPLAY APPARATUS FOR OPERATION PROMPT INFORMATION OF INPUT CONTROL

(71) Applicant: HISENSE VISUAL TECHNOLOGY CO., LTD., Shandong (CN)

(72) Inventor: Xuelei Wang, Shandong (CN)

(73) Assignee: Hisense Visual Technology Co., Ltd., Qingdao (CN)

(*) Notice: Subject to any disclaimer, the term of this patent is extended or adjusted under 35 U.S.C. 154(b) by 0 days.

(21) Appl. No.: 17/953,509

(22) Filed: Sep. 27, 2022

(65) Prior Publication Data

US 2023/0017791 A1  Jan. 19, 2023

Related U.S. Application Data

(63) Continuation of application No. PCT/CN2021/096430, filed on May 27, 2021.

(30) Foreign Application Priority Data

Sep. 4, 2020 (CN) ............ 202010920409.0

(51) Int. Cl.
  G06F 3/041   (2006.01)
  G06F 3/04855  (2022.01)
  G09G 3/20   (2006.01)

(52) U.S. Cl.
  CPC ........ G06F 3/0416 (2013.01); G06F 3/04855 (2013.01); G09G 3/20 (2013.01);
  (Continued)

(58) Field of Classification Search
  CPC ............ G09G 3/20; G09G 2354/00; G09G 2310/0297; G09G 2360/08;
  (Continued)

(56) References Cited

U.S. PATENT DOCUMENTS

2014/0125589 A1  5/2014 Kim et al.
2014/0282045 A1  9/2014 Ayanam et al.
(Continued)

FOREIGN PATENT DOCUMENTS

CN  101662603 A  3/2010
CN  102547173 A  7/2012
(Continued)

OTHER PUBLICATIONS

English Translation for CN-108965968-A, 2023, pp. 1-9 (Year: 2023).*

Primary Examiner — Jimmy H Nguyen
(74) Attorney, Agent, or Firm — Meunier Carlin & Curfman LLC

(57) ABSTRACT

Disclosed are a display method and a display apparatus for operation prompt information of an input control. The display method includes: during a user's interaction with the display apparatus, obtaining an operation instruction from a user; in response to the operation instruction, determining a target interaction mode for the user's interaction with the display apparatus; in response to a start instruction of an input control generated by invoking of the input control in the target interaction mode, obtaining target operation prompt information for the input control; and generating the input box on the user interface and display the target operation prompt information in the input box.

16 Claims, 9 Drawing Sheets

(52) U.S. Cl.
CPC ............... *G09G 2310/0297* (2013.01); *G09G 2330/021* (2013.01); *G09G 2354/00* (2013.01); *G09G 2360/08* (2013.01)

(58) Field of Classification Search
CPC .......... G09G 2330/021; G06F 3/04886; G06F 3/0489; G06F 3/04892; G06F 3/0416; G06F 3/04855; G06F 3/04895
USPC .................................................. 345/173, 169
See application file for complete search history.

(56) References Cited

U.S. PATENT DOCUMENTS

2015/0100322 A1* 4/2015 Lee .................. H04N 21/42204
 704/275
2015/0348402 A1 12/2015 Lim et al.

FOREIGN PATENT DOCUMENTS

| | | | |
|---|---|---|---|
| CN | 103105932 | A | 5/2013 |
| CN | 103369385 | A | 10/2013 |
| CN | 103813209 | A | 5/2014 |
| CN | 106484236 | A | 3/2017 |
| CN | 108965968 | A | 12/2018 |
| CN | 110018861 | A | 7/2019 |
| CN | 112087671 | A | 12/2020 |
| IN | 109189243 | A | 1/2019 |

\* cited by examiner

US 11,960,674 B2

DISPLAY METHOD AND DISPLAY APPARATUS FOR OPERATION PROMPT INFORMATION OF INPUT CONTROL

CROSS REFERENCE TO RELATED APPLICATIONS

This application is a continuation application of International Application No. PCT/CN2021/096430, filed on May 27, 2021, which claims priority to Chinese Patent Application No. 202010920409.0, filed on Sep. 4, 2020. The entire contents of this application are incorporated herein by reference.

FIELD

The present application relates to interactions of a display apparatus, and in particular, to a display method and display apparatus for operation prompt information of an input control.

BACKGROUND

A display apparatus, such as a smart television, a smart terminal, and other products with an intelligent display screen, is usually configured with an input control to implement an input function. When a user uses the input function, the display apparatus can provide an interactive mode with good experience, thereby improving user's experience.

With the development of intelligent technologies, in addition to the traditional remote control interaction mode, an interaction mode between a user and a display apparatus also includes a Bluetooth voice interaction mode and a touch interaction mode. Therefore, the input method is a frequently used function for such intelligent interactive products, and users often use the input control for human-computer interaction. Modes of processing input controls on the display apparatus include a remote control input, a voice input, and a touch input.

SUMMARY

The present application provides a display apparatus, including: a display, configured to present an image; a remote controller, including a plurality of keys; Bluetooth circuits configured to communicate with outside according to a Bluetooth protocol; a controller, in connection with the display, the remote controller and the Bluetooth circuits and configured to: during a user's interaction with the display apparatus, obtain an operation instruction from a user; in response to the operation instruction, determine a target interaction mode for the user's interaction with the display apparatus, wherein the target interaction mode includes a first interaction mode based on the remote controller and a second interaction mode based on the Bluetooth circuits; in response to a start instruction of an input control generated by invoking of the input control in the target interaction mode, obtain target operation prompt information for the input control, wherein the target operation prompt information is configured to prompt target operation content for operating the input control; and generate the input box on the user interface and display the target operation prompt information in the input box.

The present application further provides a display method, including: during a user's interaction with the display apparatus, obtaining an operation instruction from a user; in response to the operation instruction, determining a target interaction mode for the user's interaction with the display apparatus, wherein the target interaction mode includes a first interaction mode based on the remote controller and a second interaction mode based on the Bluetooth circuits; in response to a start instruction of an input control generated by invoking of the input control in the target interaction mode, obtaining target operation prompt information for the input control, wherein the target operation prompt information is configured to prompt target operation content for operating the input control; and generating the input box on the user interface and display the target operation prompt information in the input box.

DETAILED DESCRIPTION OF THE EMBODIMENTS

In order to make the objectives, embodiments and advantages of the present disclosure clearer, the exemplary embodiments of the present application will be described in combination with drawings in the exemplary embodiments of the present application. Obviously, the exemplary embodiments described are only some, not all of the embodiments.

The term "remote control" used in the present application refers to a component of an electronic device, such as the display apparatus disclosed in the present application, that can wirelessly control the electronic device, usually within a short distance range. Generally, the remote control is connected with the electronic device through infrared and/or radio frequency (RF) signals and/or Bluetooth, and may also include WiFi, wireless USB, Bluetooth, motion sensors, and other functional modules. For example, the remote control may be a handheld touch remote control which replaces most of the physical built-in keys in a general remote control device with a user interface in a touch screen.

Figure 1:
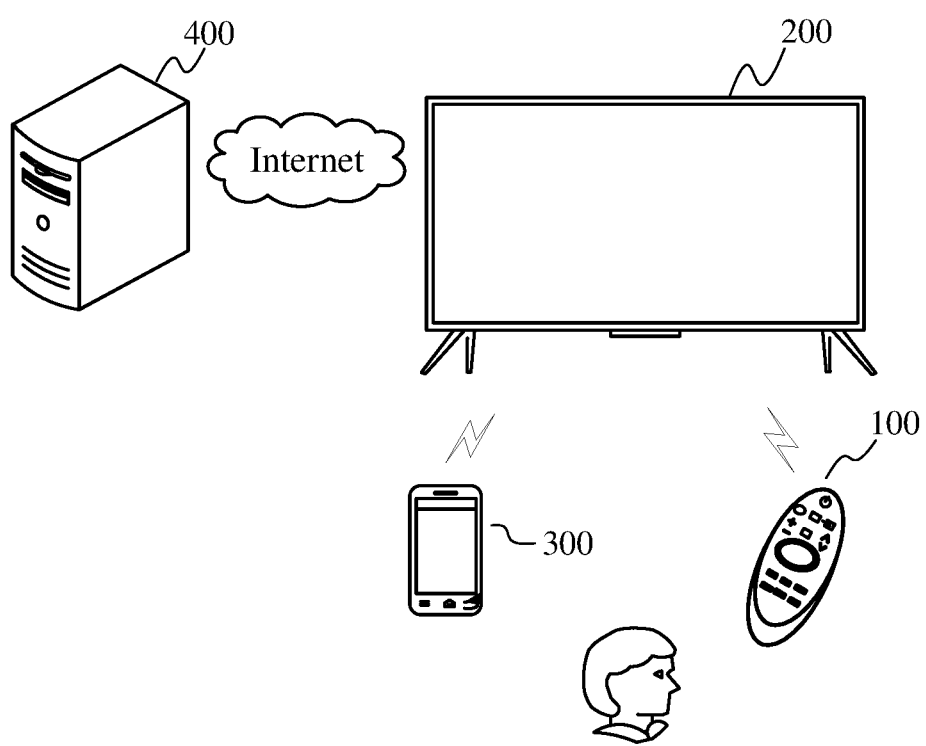
FIG. 1 shows a schematic diagram of a scenario between a display apparatus and a control device according to some embodiments of the present application.

FIG. 1 illustrates a schematic diagram of an operating scenario between a display apparatus and a control device according to some embodiments of the present application. As shown in FIG. 1, a user may operate the display apparatus 200 through a mobile terminal 300 and the control device 100.

In some embodiments, the control device 100 may be a remote control. Communications between the remote control and the display apparatus include at least one of infrared protocol communication, Bluetooth protocol communication, and other short-distance communication manners. The remote control controls the display apparatus 200 in a wireless or wired manner. The user may control the display apparatus 200 by inputting a user command by adopting at least one of input methods such as key input on the remote control, voice input, or control panel input, etc. For example, the user can input a corresponding control command through a volume up/down key, a channel control key, up/down/left/right direction keys, a voice input key, a menu key, a power key, etc. on the remote control to control the display apparatus 200.

In some embodiments, a mobile terminal, a tablet, a computer, a laptop, and other smart devices may also be configured to control the display apparatus 200. For example, the display apparatus 200 is controlled using an application running on the smart device. The application, through configuration, may provide the user with a variety of controls in an intuitive user interface (UI) on a screen associated with the smart device.

In some embodiments, the mobile terminal 300 may install a software application with the display apparatus 200 for connection communication via a network communication protocol for one-to-one control operation and data communication purposes. For example, a control command protocol may be established between the mobile terminal 300 and the display apparatus 200, a remote control keyboard can be synchronized onto the mobile terminal 300, and the function of the display apparatus 200 can be implemented by controlling a user interface on the mobile terminal 300. It is also possible to transmit audio and video content displayed on the mobile terminal 300 to the display apparatus 200 to implement a synchronous display function.

As shown in FIG. 1, the display apparatus 200 is also in data communication with a server 400 through a variety of communication modes. The display apparatus 200 may be in communication connection with the server 400 through a local area network (LAN), a wireless local area network (WLAN), or other networks. The server 400 may provide various content and interactions for the display apparatus 200. Exemplarily, the display apparatus 200 receives software program updates by sending and receiving information and electronic program guide (EPG) interaction, or accesses a remotely stored digital media library. The server 400 may be a cluster or a plurality of clusters and may include one or more types of servers. Other web service content such as video-on-demand and advertising services is provided by the server 400.

The display apparatus 200 may be a liquid crystal display, an OLED display, a projection display apparatus. The specific type, size, resolution, and the like of the display apparatus are not limited, and it will be understood by those skilled in the art that the display apparatus 200 may vary in performance and configuration as desired.

In addition to providing the function of a broadcast reception television, the display apparatus 200 may additionally provide the function of a computer-supported smart network television, including, but not limited to, a network television, a smart television, an internet protocol television (IPTV), and the like.

Figure 2:
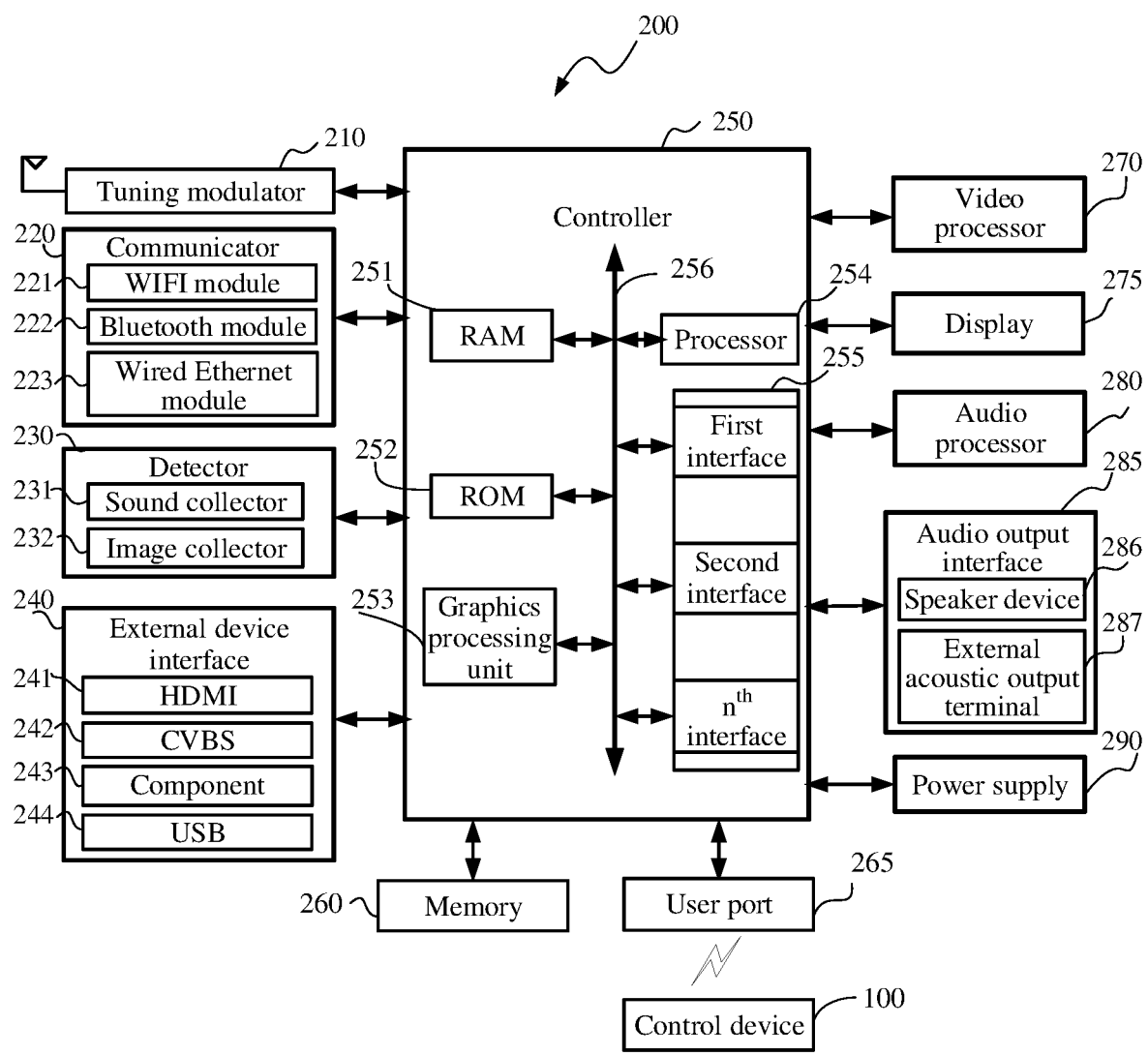
FIG. 2 shows a block diagram of hardware configuration of a display apparatus 200 according to some embodiments of the present application.

FIG. 2 illustrates a block diagram of hardware configuration of a display apparatus 200 according to some embodiments of the present application.

In some embodiments, the display apparatus 200 includes at least one of a controller 250, a tuning demodulator 210, a communicator 220, a detector 230, an input/output interface 255, a display 275, an audio output interface 285, a memory 260, a power supply 290, a user port 265, and an external device interface 240. The external device interface 240 includes HDMI 241, CVBS 242, Component 243 and USB 244.

In some embodiments, the display 275 is configured to receive image signals output from a first processor, display video content and images, and present a menu manipulation interface.

In some embodiments, the display 275 includes a panel component configured to present pictures and a driving component configured to drive display of images.

In some embodiments, the displayed video content may be from broadcast television content or various broadcast signals that may be received according to wired or wireless communication protocols. Alternatively, various image content sent from the network server side and received according to the network communication protocol may be displayed.

In some embodiments, the display 275 is configured to present a user-manipulated UI generated in the display apparatus 200 and configured to control the display apparatus 200.

In some embodiments, depending on the type of the display 275, a driving component for driving the display is also included.

In some embodiments, the display 275 is a projection display and may also include a projection device and a projection screen.

In some embodiments, the communicator 220 is a component configured to communicate with an external device or an external server according to various communication protocols. For example, the communicator 220 may include at least one of a Wifi module 221, a Bluetooth module 222, a wired Ethernet module 223, and other network communication protocol modules or near field communication protocol modules, and an infrared receiver.

In some embodiments, control signal and data signal transmission and reception may be established between the display apparatus 200 and the external control device 100 or a content providing device through the communicator 220.

In some embodiments, the user port 265 may be configured to receive infrared control signals from the control device 100 (e.g., an infrared remote control, and the like).

In some embodiments, the detector 230 of the display apparatus 200 is configured to acquire signals of the external environment or signals interacting with the outside.

In some embodiments, the detector 230 includes a light receiver, a sensor configured to collect ambient light intensity, and changes in parameters can be adaptively displayed by collecting ambient light, and the like.

In some embodiments, the detector 230 may also include an image collector 232, such as a camera, or the like, that may be configured to collect external environmental scenes, as well as to collect user attributes or user interaction gestures, may adaptively change display parameters, and may also recognize user gestures to implement the functions of interacting with the user.

In some embodiments, the detector 230 may also include a temperature sensor or the like, such as for sensing ambient temperature.

In some embodiments, the display apparatus 200 may adaptively adjust the display color temperature of the image. For example, when the temperature is high, the display apparatus 200 can be adjusted to display colder tones, or when the temperature is low, the display apparatus 200 can be adjusted to display warmer tones.

In some embodiments, the detector 230 also includes a sound collector 231 or the like, such as a microphone, which can be configured to receive the sound from a user, exemplarily, including a voice signal of a command from the user to control the display apparatus 200, or collect ambient sound for identifying an ambient scene type so that the display apparatus 200 can adapt to ambient noise.

In some embodiments, as shown in FIG. 2, the input/output interface 255 (such as the first interface, second interface, . . . , n$^{th}$ interface as shown) is configured to realize data transfer between the controller 250 and other external devices or other controllers 250, such as receiving video signal data and audio signal data from an external device, or command data, etc.

In some embodiments, the external device interface 240 may include, but is not limited to, any one or more of: a high-definition multimedia interface (HDMI), an analog or data high-definition component input interface, a composite video input interface, a USB input interface, an RGB port, and the like. The plurality of interfaces described above may form a composite input/output interface.

In some embodiments, as shown in FIG. 2, the tuning demodulator 210 is configured to receive broadcast signals in a wired or wireless manner, perform modulation-demodulation processing such as amplification, mixing, and resonance, and demodulate audio and video signals from a plurality of wireless or wired broadcast signals, and the audio and video signals may include an audio and video signal carried in a television channel frequency selected by a user, and an EPG data signal.

In some embodiments, the frequency points demodulated by the tuning demodulator 210 are controlled by the controller 250, which can send control signals based on user selection to cause the modem to respond to the television signal frequency selected by the user and modulate the television signal carried by the frequency.

In some embodiments, the broadcast signal may be classified into a terrestrial broadcast signal, a wired broadcast signal, a satellite broadcast signal, or an Internet broadcast signal, among others according to the television signal broadcast system, or may be classified into a digital modulation signal, an analog modulation signal, or the like depending on the modulation type, or may be classified into a digital signal, an analog signal, or the like depending on the kind of signals.

In some embodiments, the controller 250 and the tuning demodulator 210 may be located in different individual devices, i.e. the tuning demodulator 210 may also be in a device external to the host device where the controller 250 is located, such as an external set top box. In this way, the set-top box outputs a television audio and video signal modulated and demodulated from the received broadcast television signals to the host device, and the host device receives the audio and video signal through the first input/output interface.

In some embodiments, the controller 250 controls the operation of the display apparatus and responds to the operation from the user through various software control programs stored in the memory. The controller 250 may control the overall operation of the display apparatus 200. For example, in response to receiving a user command for selecting a UI object presented on the display 275, the controller 250 may perform an operation related to the object selected by the user command.

In some embodiments, the object may be any one of selectable objects, such as a hyperlink or icon. The operation related to the selected object is, for example, an operation of displaying a page, document or image connected to a hyperlink, or an operation of launching an application corresponding to the icon. The user command for selecting the UI object may be an command input via various input devices (e.g., a mouse, a keyboard, a touch pad, etc.) connected to the display apparatus 200 or a voice command corresponding to a voice spoken by the user.

As shown in FIG. 2, the controller 250 includes at least one of a random access memory (RAM) 251, a read-only memory (ROM) 252, a video processor 270, an audio processor 280, or other processors 253 (e.g., a graphics processing unit (GPU), a processor (such as central processing unit, CPU) 254), a communicator, and a communication bus 256, wherein the communication bus connects the various components.

In some embodiments, the RAM 251 is configured to store temporary data for an operating system or other running programs.

In some embodiments, the ROM 252 is configured to store various system start-up instructions.

In some embodiments, the ROM 252 is configured to store a basic input output system (BIOS), which is configured to complete the power-on self-test of the system, initializing functional modules in the system, storing a drive program of basic input/output of the system, and guiding an operating system.

In some embodiments, upon receiving a power-on signal, the power supply of the display apparatus 200 is started and the processor 254 runs the system start-up instruction in the ROM 252 and copies temporary data of the operating system stored in the memory into the RAM 251 to facilitate start-up or running of the operating system. After the startup of the operating system is completed, the processor 254 copies temporary data of various applications in the memory into the RAM 251, to facilitate start-up or running of the various applications.

In some embodiments, the processor 254 is configured to run operating system and application instructions stored in the memory, and run various applications, data, and content according to various received externally input interaction instructions in order to ultimately display and play various audio-video content.

In some example embodiments, the processor 254 may include a plurality of processors. The plurality of processors may include one main processor and one or more sub-processors. The main processor is configured to perform some operations of the display apparatus 200 in a prepower-up mode, and/or operations of display the picture in a normal mode. The one or more sub-processors are configured to perform operations in a standby mode or the like.

In some embodiments, the GPU 253 is configured to generate various graphic objects such as icons, operating menus, display graphics for user input instructions, and the like. An operator is included to operate by receiving various interaction instructions input from a user and display various objects according to display attributes. A renderer is further included to render various objects obtained based on the operator, and the rendered objects are displayed on the display.

In some embodiments, the video processor 270 is configured to receive external video signals, and perform video processing such as decompression, decoding, scaling, noise reduction, frame rate conversion, resolution conversion, image composition, etc. according to standard codec protocols of the input signals, to obtain signals that can be displayed or played directly on the display apparatus 200.

In some embodiments, the video processor 270 includes a demultiplexing module, a video decoding module, an image composition module, a frame rate conversion module, a display formatting module, and the like.

Wherein the demultiplexing module is configured to demultiplex the input audio and video data stream, for example, the input MPEG-2 is demultiplexed into a video signal, an audio signal, and the like by the demultiplexing module.

The video decoding module is configured to process the demultiplexed video signal, and the processing includes decoding and scaling.

The image composition module, such as an image compositor, is configured to overlay and mix a GUI signal that is input from the user or self-generated by an image generator with a scaled video image to generate an image signal for display.

The frame rate conversion module is configured to convert an input video frame rate, such as converting a 60 Hz frame rate to a 120 Hz frame rate or a 240 Hz frame rate typically by frame interpolation.

The display formatting module is configured to output a signal of the video subjected to frame rate conversion and convert to the signal conforming to the display format, such as outputting an RGB data signal.

In some embodiments, the graphics processing unit 253 and the video processor may be integrated or separated, may perform processing of graphics signals output to the display when integrated, and may separately perform different functions, such as GPU+FRC (Frame Rate Conversion) architecture when separated.

In some embodiments, the audio processor 280 is configured to receive an external audio signal, and perform processing such as decompression and decoding, and noise reduction, digital-to-analog conversion, and amplification according to a standard codec protocol of an input signal, to obtain a sound signal that can be played in a speaker device.

In some embodiments, the video processor 270 may include one or more chips. The audio processor may also include one or more chips.

In some embodiments, the video processor 270 and the audio processor 280 may be separate chips or integrated in one or more chips with the controller.

In some embodiments, the audio output interface is configured to receive a sound signal output from the audio processor 280 under the control of the controller 250, and includes, for example, a speaker device 286, as well as an external acoustic output terminal 287 that can be output to a speaker device of an external device, such as an external audio port or headphone port, etc., in addition to a speaker device in the display apparatus 200, and may also include a short-range communication module in the communicator, for example, a Bluetooth module for Bluetooth speaker device sound output.

The power supply 290, under the control of the controller 250, provides power input from an external power supply to the display apparatus 200 to provide power supply support. The power supply 290 may include a built-in power circuit installed inside the display apparatus 200, or may be a power supply installed outside the display apparatus 200, and provides a power interface of an external power supply in the display apparatus 200.

The user port 265 is configured to receive input signals from a user and then send the received user input signals to the controller 250. The user input signal may be a remote control signal received through an infrared receiver, and various user control signals that may be received through a network communication module.

In some embodiments, the user inputs a user command through the control device 100 or the mobile terminal 300, the user input interface is to receive the input from the user, and the display apparatus 200 responds to the input from the user through the controller 250.

In some embodiments, the user may enter a user command on a graphical user interface (GUI) on the display 275, and the user input interface receives the user input instruction through the graphical user interface (GUI). Alternatively, the user may input a user command by inputting a certain sound or gesture, and the user input interface receives the user input instruction by recognizing the sound or gesture through a sensor.

The memory 260 is configured to store various software modules for driving the display apparatus 200, such as various software modules stored in the first memory, including at least one of a basic module, a detection module, a communication module, a display control module, a browser module, various service modules, and the like.

The basic module is configured to realize signal communication between the various hardware in the display apparatus 200 and to send the underlying software module configured to process and control signals to the upper module. The detection module is a management module configured to collect various kinds of information from various sensors or user input interfaces and perform digital-to-analog conversion and analysis management.

For example, a voice parsing module and a voice command database module are included in the voice recognition module. The display control module is a module configured to control the display to display image content and may be configured to play information such as multimedia image content and a UI interface. The communication module is configured to be in control and data communication with an external device. The browser module is configured to perform data communication between browsing servers. The service module is configured to provide various services and various types of applications. Meanwhile, the memory 260 is also configured to store received external data and user data, images of items in various user interfaces, visual effects of a focus object, and the like.

Figure 3:
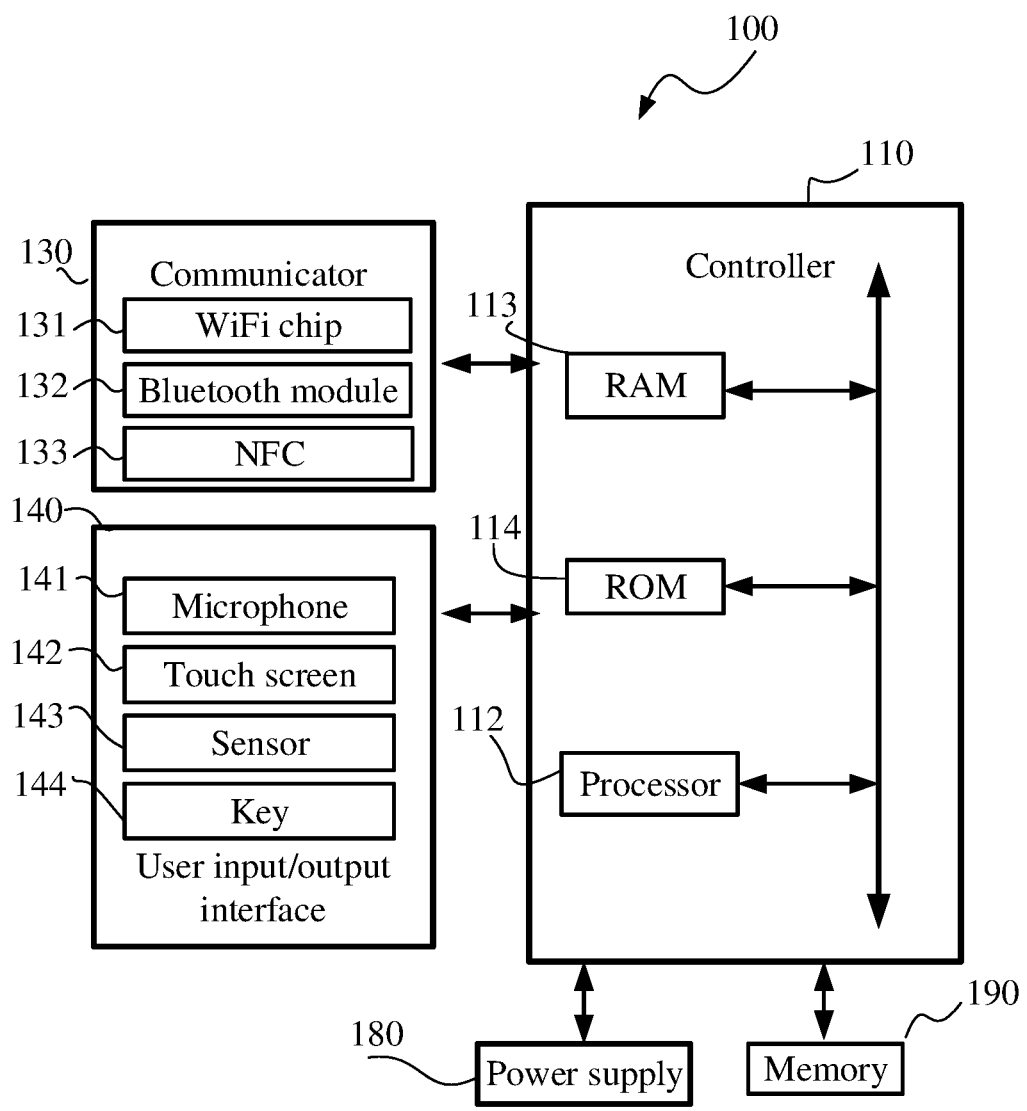
FIG. 3 shows a block diagram of hardware configuration of a control device 100 according to some embodiments of the present application.

FIG. 3 illustrates a configuration block diagram of a control device 100 according to some embodiments of the present application. As shown in FIG. 3, the control device 100 includes a controller 110, a communicator 130, a user input/output interface, a memory, and a power supply.

The control device 100 is configured to control the display apparatus 200, and may receive commands input from a user and convert the commands into instructions that the display apparatus 200 can recognize and respond to, so as to function as interactive media between the user and the display apparatus 200. For example, the user operates a channel plus and minus key on the control device 100, and the display apparatus 200 responds to a channel plus and minus operation.

In some embodiments, the control device 100 may be a smart device. For example, the control device 100 may install various applications for controlling the display apparatus 200 according to user's requirements.

In some embodiments, as shown in FIG. 1, the mobile terminal 300 or other intelligent electronic devices may play a similar function to the control device 100 after being installed with an application that can be configured to manipulate the display apparatus 200. For example, after the user installs the application, various function keys or virtual buttons of a graphical user interface that may be provided on the mobile terminal 300 or other intelligent electronic devices can function as physical keys of the control device 100.

The controller 110 includes a processor 112, an RAM 113, an ROM 114, a communicator 130 and a communication bus. The controller is configured to control the running and operation of the control device 100, as well as communication cooperation between internal components and external and internal data processing functions.

The communicator 130 realizes communication of control signals and data signals with the display apparatus 200 under the control of the controller 110. For example, user input signals are sent to the display apparatus 200. The communicator 130 may include at least one of a WiFi chip 131, a Bluetooth module 132, an NFC module 133, and other near field communication modules.

A user input/output interface 140 includes at least one of a microphone 141, a touch screen 142, a sensor 143, a key 144 and other input interfaces. For example, the user may issue a user command by voice, touch, gesture, press, etc., and the input interface converts the received analog signal into a digital signal and coverts the digital signal into a corresponding command signal, which is then sent to the display apparatus 200.

The output interface includes an interface configured to send user instructions to the display apparatus 200. In some embodiments, the output interface may be an infrared interface or a radio frequency interface. For example, when the output interface is an infrared signal interface, it is required to convert the user input commands into infrared control signals according to the infrared control protocol and send the infrared control signals to the display apparatus 200 by an infrared sending module. For another example, when the output interface is a radio frequency signal interface, it is required to convert the user input commands into digital signals, then modulate the digital signals by a radio frequency control signal modulation protocol and send the modulated digital signals to the display apparatus 200 by a radio frequency sending module.

In some embodiments, the control device 100 includes at least one of the communicator 130 and the input/output interface 140. By configuring the communicator 130, such as a WiFi module, a Bluetooth module, an NFC module, etc. in the control device 100, user input commands can be sent to the display apparatus 200 according to WiFi protocol or Bluetooth protocol or NFC protocol.

A memory 190 is configured to store various running programs, data, and applications that drive and control the control device 200 under the control of the controller. The memory 190 may store various types of control signal commands input from the user.

A power supply 180 is configured to provide power support for running of the various elements of the control device 100 under the control of the controller, and may include a battery and associated control circuitry.

In some embodiments, the system may include a Kernel, a command parser (shell), a file system, and applications. The kernel, the shell, and the file system together form a basic operating system structure that allows users to manage files, run programs, and use the system. After power-on, the kernel boots up, activates the kernel space, abstracts hardware, initializes hardware parameters, etc., runs and maintains virtual memory, schedulers, signals, and inter-process communication (IPC). After the kernel boots up, the shell and user applications are loaded. The application is compiled into machine codes to form a process.

Figure 4:
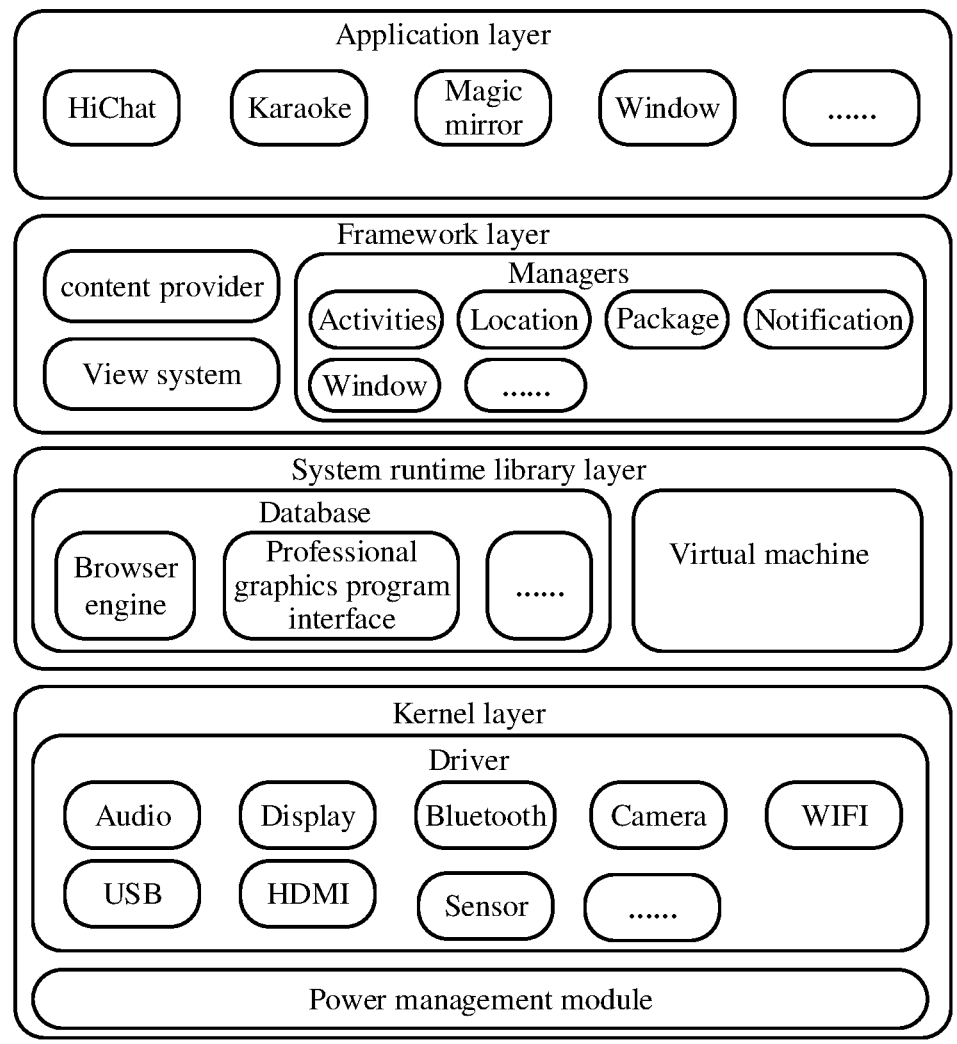
FIG. 4 shows a schematic diagram of software configuration in a display apparatus 200 according to some embodiments of the present application.

FIG. 4 illustrates a schematic diagram of software configuration in the display apparatus 200 according to some embodiments of the present application. Referring to FIG. 4, in some embodiments, the system is divided into four layers: an application layer, an application framework layer (referred to as "framework layer"), an Android runtime and system library layer (referred to as "system runtime library layer"), and a kernel layer from top to bottom respectively.

In some embodiments, at least one application runs in the application layer, and these applications may include a Window application, a system setting application, a clock application, a camera application, etc. in an operating system; these applications may also include applications developed by a third-party developer, such as a HiChat application, a Karaoke application, a MagicMirror application, a Window, and the like. In specific implementations, the application packages in the application layer are not limited to the above examples, but may actually include other application packages, and embodiments of the present application are not limited thereto.

The framework layer provides an application programming interface (API) and a programming framework for applications at the application layer. The application framework layer includes some predefined functions. The application framework layer works like a processing center that causes applications in the application layer to act. Applications, via API interfaces, can access resources in the system and retrieve services from the system.

As shown in FIG. 4, the application framework layer in embodiments of the present application includes managers, a content Provider, and the like, wherein the managers include at least one of the following modules: an activity manager, configured to interact with all the activities that are running in the system; a location manager, configured to provide system services or applications with access to system location services; a package manager, configured to retrieve various information related to the application packages currently installed on the device; a notification manager, configured to control the display and removal of notification messages; and a window manager, configured to manage icons, windows, toolbars, wallpaper, and tabletop components on a user interface.

In some embodiments, the activity manager is configured to manage the lifecycle of the applications and the usual navigation back function, such as controlling the application to exit (including switching the currently displayed user interface in the display window to the system desktop), launched, back (including switching the currently displayed user interface in the display window to the previous level of the currently displayed user interface), and the like.

In some embodiments, the window manager is configured to manage all window applications, such as obtaining the size of the display screen, determining whether there is a status bar, locking the screen, capturing the screen, controlling display window changes (such as minified display, dithering display and distortion display of the display window), and the like.

In some embodiments, the system runtime library layer provides support for an upper layer, i.e., the framework layer, and when the framework layer is used, the Android operating system runs C/C++ libraries included in the system runtime library layer to implement the function realized by the framework layer.

In some embodiments, the kernel layer is a layer between hardware and software. As shown in FIG. 4, the kernel layer includes at least one of the following drivers: audio drivers, display drivers, Bluetooth drivers, camera drivers, WIFI drivers, USB drivers, HDMI drivers, sensor drivers (e.g., fingerprint sensors, temperature sensors, touch sensors, pressure sensors, etc.), and the like.

In some embodiments, the kernel layer further includes a power driving module for power management.

In some embodiments, software programs and/or modules corresponding to the software architecture in FIG. 4 are stored in the first memory or the second memory shown in FIG. 2 or FIG. 3.

In some embodiments, taking the MagicMirror application (photographing application) as an example, when a remote control receiving device receives an input operation from a remote control, a corresponding hardware interrupt is sent to the kernel layer. The kernel layer processes the input operation into an original input event (including information such as a key value of the input operation, and a timestamp of the input operation). The original input event is stored at the kernel layer. The application framework layer obtains the original input event from the kernel layer. A control corresponding to the input event is identified according to the current location of the focus and the input operation is determined as a confirmation operation, wherein the confirmation operation is for the control, that is, the icon of the MagicMirror application. An interface at the application framework layer is invoked to launch the MagicMirror application and then the camera driver in the kernel layer is started to capture static image or video by the camera.

In some embodiments, for a display apparatus with a touch function, taking a split-screen operation as an example, the display apparatus receives an input operation (e.g., a split-screen operation) by a user on the display screen, the kernel layer can generate a corresponding input event based on the input operation, and report the event to the application framework layer. The window mode (e.g., multi-window mode) and window location and size, etc., corresponding to the input operation are set by the activity manager of the application framework layer. The window manager of the application framework layer draws windows according to the settings of the activity manager and then sends the drawn window data to the display driver of the kernel layer, and the display driver displays application interfaces corresponding thereto on different display areas of the display screen.

Figure 5:
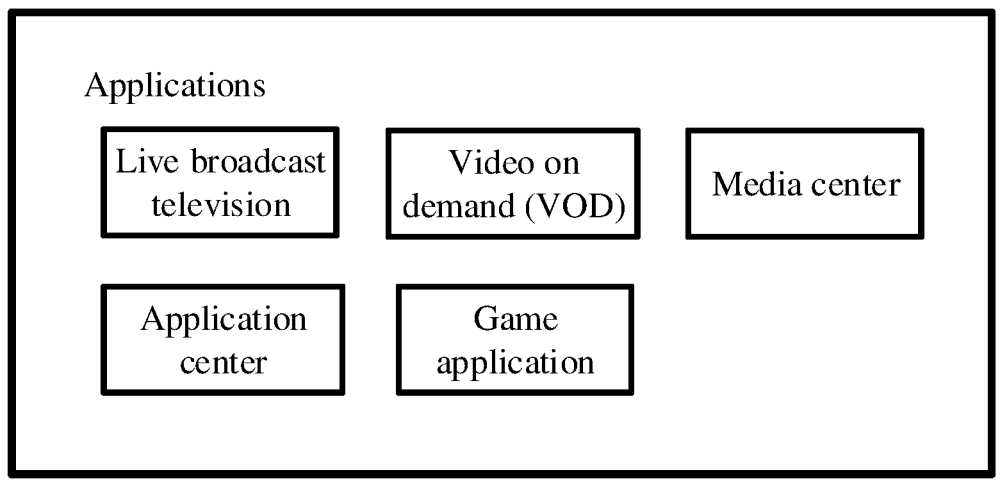
FIG. 5 shows a display schematic diagram of an application icon interface in a display apparatus 200 according to some embodiments of the present application.

FIG. 5 illustrates an interface display schematic diagram of icons of applications in a display apparatus 200 according to some embodiments of the present application. In some embodiments, as shown in FIG. 5, an application layer includes at least one application icon that can be displayed in the display, such as an application icon of a live broadcast television, an application icon of a video-on-demand (VOD), an application icon of a media center, an application icon of an application center, and an application icon of a game application.

In some embodiments, there may be scenarios where the user interacts with the display apparatus using input methods, such as scenarios of registering usernames, searching for movie names, intelligently chatting with other users, and the like. Since an intelligent display apparatus is typically equipped with a remote control for controlling the display apparatus; in yet other embodiments, a Bluetooth voice function and a touch function are also configured within the intelligent display apparatus, the display apparatus can be controlled by means of Bluetooth input or touch input.

In view of the above three interaction modes where the user interacts with the display apparatus, such that when the user interacts with the display apparatus by using an input control, there are also three modes for operating the input control: a key on a remote control, voice, and touch. If there are other interaction modes for controlling the display apparatus, then corresponding modes for operating the input control are generated, which is not specifically limited in this embodiment.

Different modes of operating the input control correspond to different prompt information and are displayed in an input box of the input control to facilitate prompting of the manipulation content of each interaction mode for the user.

Figure 6:
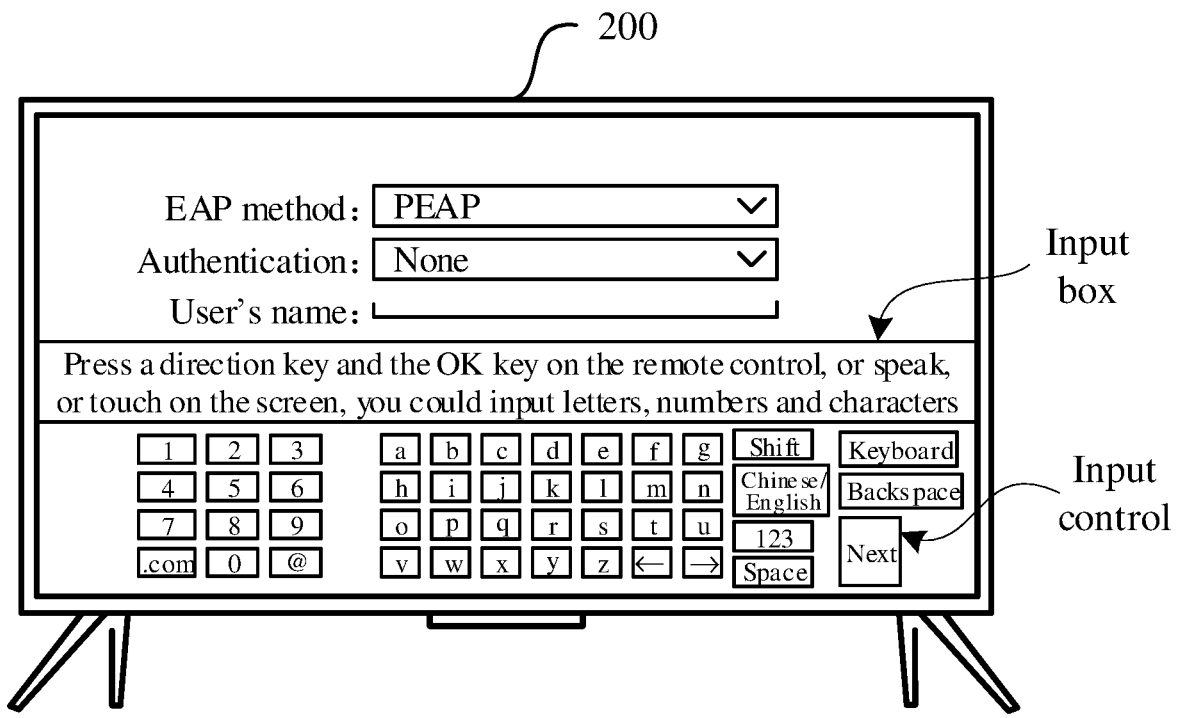
FIG. 6 shows a display schematic diagram of existing manipulation of prompt information according to some embodiments of the present application.

FIG. 6 illustrates a schematic diagram for presenting prompt information for operation according to some embodiments of the present application. Referring to FIG. 6, when displaying operation prompt information, a display apparatus usually displays the operation prompt information in each manner for operation on an input control in an input box simultaneously. However, this method makes the displayed information lengthy, so that the user cannot quickly obtain the operation prompt information in an operation manner that the user prefers, resulting in poor user's experience.

In this regard, embodiments of the present disclosure provide a display apparatus. The display apparatus is configured to determine a specific operation mode of an input control by identifying operation scenarios when a user interacts with the display apparatus, i.e., identifying a specific operation interaction mode in which the user interacts with the display apparatus. In different operation scenarios, i.e., different operations of an input control used by the user, the input box can display different operation prompt information to avoid the display of redundant and burdensome operation prompt information, to thereby effectively improve the user's reading efficiency and further improve user's experience for input interactions.

In some embodiments, embodiments of the present disclosure provide a display apparatus. The display apparatus includes a display and a controller. The display is configured to present a user interface on which an input box is displayed, where the input box is a control generated when an input control is initiated, and the input box is configured to display operation prompt information. The input box is displayed above the input control. The controller is connected with the display and is configured to perform a display method for operation prompt information of an input control to display different operation prompt information in the input box under different operation modes of an input control.

Figure 7:
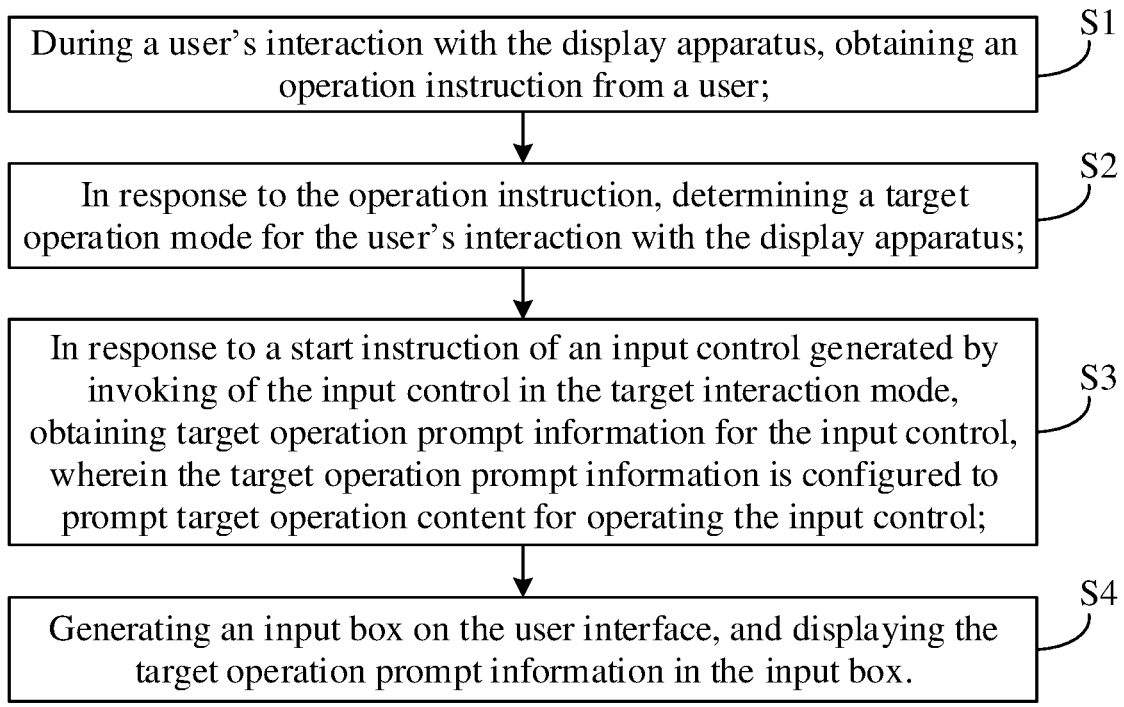
FIG. 7 shows a flowchart of a display method for operation prompt information of an input control according to some embodiments of the present application.

FIG. 7 illustrates a flowchart of a display method for operation prompt information of an input control according to some embodiments of the present application. An embodiment of the present disclosure provides a display apparatus configured with a controller for performing the following operations when executing the method shown in FIG. 7.

S1, during a user's interaction with the display apparatus, obtaining an operation instruction.

The controller is configured with an operation service. The manipulation service is configured to monitor instructions from the user in real time, and are specifically configured to monitor in real time operation instructions from the user, i.e. instructions generated in a interaction mode which the user is used to interact with the display apparatus, including but not limited to an instruction input based on a key on a remote control key, a voice instruction, a touch instruction and the like.

In order for the controller to ensure the effectiveness of the operation instruction generated based on a certain interaction mode adopted by the user within the specific period of time, the operation instruction and an initial time when the operation instruction is obtained can be stored while the user is interacting with the display apparatus, and the initial time is configured to determine whether the operation instruction is invalid.

The operation mode adopted by the user is valid only for a period of time, that is, the corresponding operation instruction is valid for a period of time. Outside of this period of time, the operation instruction disappears and corresponding operation prompt information is no longer displayed based on the operation instruction, but each operation prompt information is displayed in a scrolling manner.

S2, in response to the operation instruction, determining a target operation mode for operating the input control.

The interaction mode for operating the input control, is a mode which the user uses to input for interacting with the display apparatus. For example, if the interaction mode which the user uses to interact with the display apparatus is via a key on a remote control, then the operation mode for operating the input control is via a key on a remote control; if the interaction mode which the user uses to interact the display apparatus is Bluetooth voice, that is voice command mode based on Bluetooth protocol, then the operation mode for operating the input control is Bluetooth voice; if the interaction mode which the user uses to interact with the display apparatus is hand touch, then the operation mode for operating the input control is hand touch.

Accordingly, a target operation mode for operating the input control may be determined based on the obtained operation instruction.

As different operation instructions carry different identifiers to identify the targeted interaction mode. Thus, based on the identifier carried in the received operation instruction, the controller can determine the target interaction mode adopted by the current user in interaction with the display apparatus, and further can determine the target interaction mode adopted by the user in operation the input control.

S3, in response to a start instruction for the input control generated based on the input control being operated by the target interaction mode, obtaining target operation prompt information, wherein the target operation prompt information is configured to prompt target operation content for operating the input control.

Upon determining the target operation mode, it means that the current user invokes and operates the input control in the target interaction mode. For example, if the target interaction mode is a remote control key mode, then the user invokes and operates the input control through a key on the remote control; if the target interaction mode is a voice interaction mode via Bluetooth, then the user invokes and operates the input control through a voice mode; if the target interaction mode is a hand touch mode, then the user invokes and operates the input control through touch.

When the user invokes the input control in the target interaction mode, a start instruction for the input control is generated and sent to the controller. After receiving the start instruction of the input control, the controller can obtain target operation prompt information for convenient display, to prompt the user of the target operation content for operating the input control.

The operation instruction generated when the user interacts with the display apparatus based on a certain interaction mode is only valid for a period of time so that corresponding operation prompt information can be accurately displayed in different interaction scenarios. Thus, when the controller obtains the target operation prompt information to be displayed, the controller first needs to determine whether the interaction instruction is invalid, and if the operation instruction is valid, the controller obtains the target operation prompt information corresponding to the target interaction mode and displays the target operation prompt information directly; if the operation instruction is invalid, the controller obtains operation prompt information corresponding to all interaction modes and displays the target operation prompt information in a scrolling manner.

Figure 8:
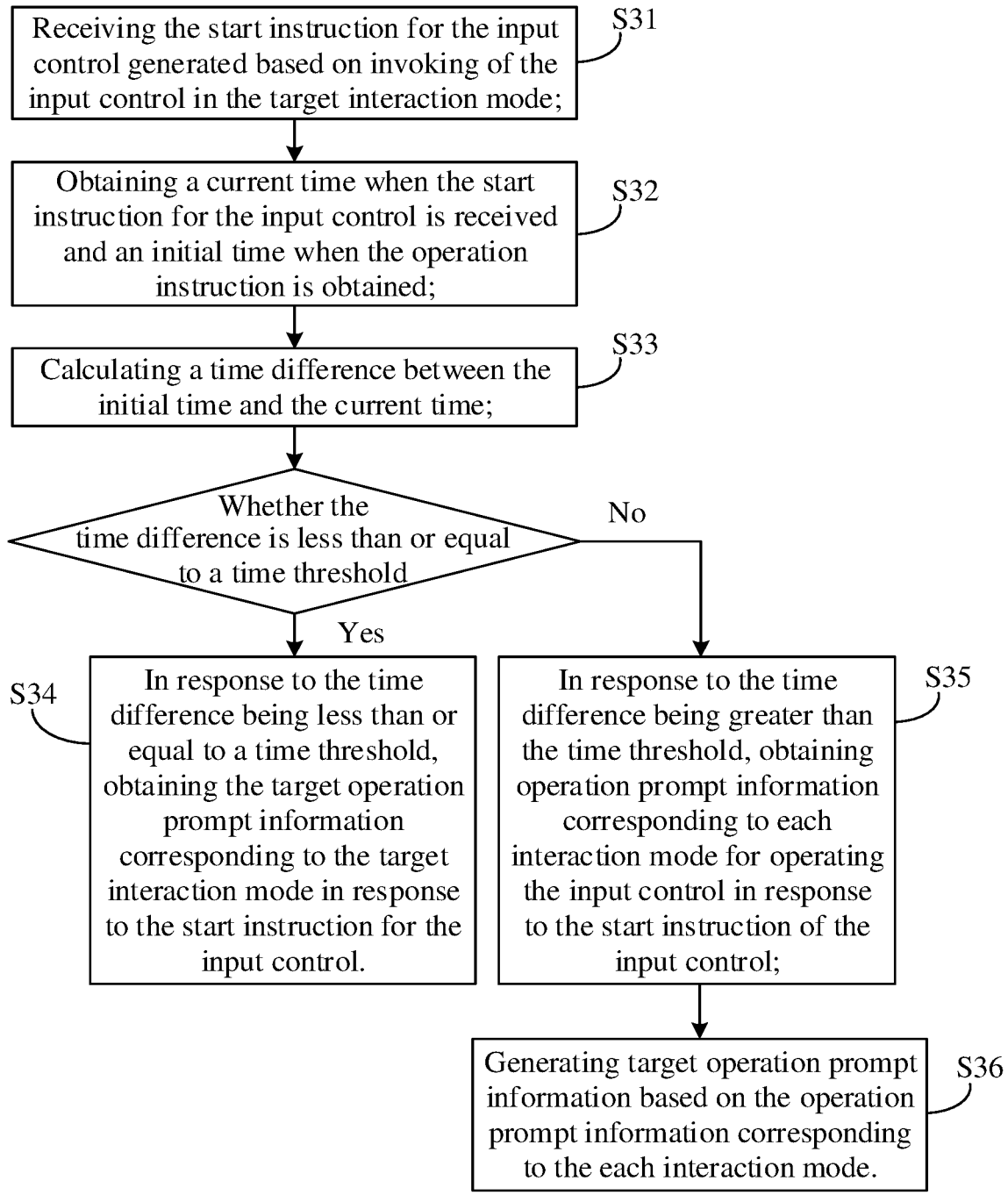
FIG. 8 shows a flowchart of a method for obtaining target operation prompt information according to some embodiments of the present application.

FIG. 8 illustrates a flowchart of a method of obtaining target operation prompt information according to some embodiments of the present application. In some embodiments, referring to FIG. 8, the controller configured to obtain, in response to the start instruction for the input control generated based on invoking manner of the input control in the target interaction mode, the target operation prompt information, is further configured to perform the operations of S31 to S34.

S31, receiving the start instruction for the input control generated based on invoking of the input control in the target interaction mode.

S32, obtaining a current time when the start instruction for the input control is received and an initial time when the operation instruction is obtained.

S33, calculating a time difference between the initial time and the current time.

S34, in response to the time difference being less than or equal to a time threshold, obtaining the target operation prompt information corresponding to the target interaction mode in response to the start instruction for the input control.

In order to accurately determine whether the operation instruction generated during interacting with the display apparatus in a certain interaction mode is invalid, the current time of the display apparatus when the start instruction for the input control is received needs to be obtained.

The time difference between the initial time when the operation instruction is received and the current time when the start instruction of the input control is received is calculated, and the time difference can indicate the duration from the input control being invoked to the operation instruction being received.

The time difference is compared with a time threshold, which in some embodiments may be set as 120 minutes, or may be configured to be other threshold, depending on the specific requirements. If the time difference is less than or equal to the time threshold, it is indicated that the user has invoked the input control within 120 minutes, then it can be determined that the operation instruction generated during interacting with the display apparatus in a certain interaction mode is not invalid.

When the interaction mode is not invalid, the controller is configured to: in response to the start instruction of the input control, obtain target operation prompt information corresponding to the target interaction mode, and the target operation prompt information refers to prompt information required when the target interaction mode is adopted for operating the input control, and is configured to prompt target operation content for operating the input control.

Figure 9:
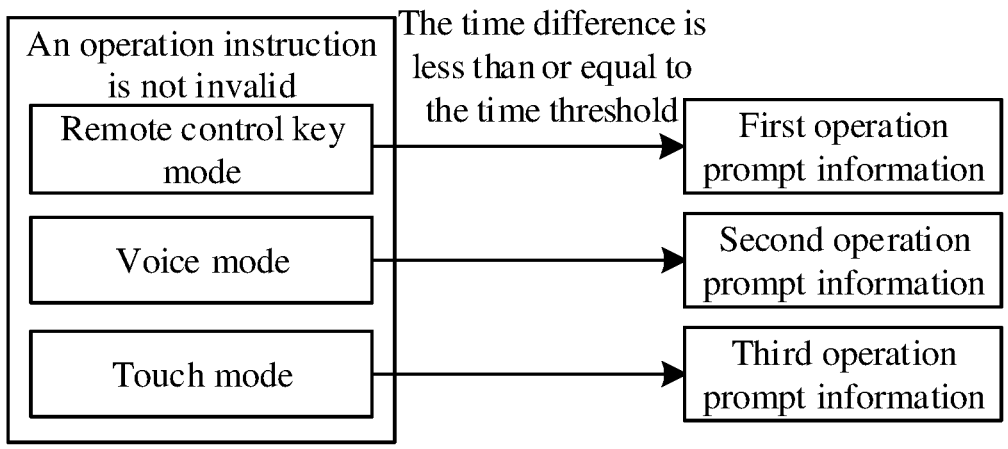
FIG. 9 shows a first schematic diagram of obtaining target operation prompt information according to some embodiments of the present application.

FIG. 9 illustrates a first schematic diagram of obtaining target operation prompt information according to some embodiments of the present application. Referring to FIG. 9, for example, if an operation instruction generated during interacting with the display apparatus in a remote control key mode is not invalid, it is determined that the target interaction mode is a remote control key mode, the obtained target operation prompt information corresponding to the remote control key mode is first operation prompt information for prompting operation of the input control in the remote control key mode, and the content of the first operation prompt information is like "press a direction key and the OK key on the remote control, you could input letters, numbers and characters".

For example, if an operation instruction generated during interacting with the display apparatus in a Bluetooth voice mode is not invalid, it is determined that the target interaction mode is a voice mode, the obtained target operation prompt information corresponding to the voice mode is second operation prompt information for prompting operation of the input control in the voice mode, and the second operation prompt information may be "speak, you could input letters, numbers and characters".

For example, if an operation instruction generated during interacting with the display apparatus in a touch mode is not invalid, it is determined that the target interaction mode is a touch mode, the obtained target operation prompt information corresponding to the touch mode is third operation prompt information for prompting operation of the input control in the touch, and the third operation prompt information content may be "touch the screen, you could input letters, numbers and characters".

As can be seen, when an operation instruction generated during interacting with the display apparatus in a target interaction mode is not invalid (the time difference is less than or equal to the time threshold), target operation prompt information corresponding to the target interaction mode can be obtained, and when the target operation prompt information is displayed, prompt information corresponding to only one corresponding interaction mode is presented on the display, for facilitating viewing for the user and avoiding tedious display, and the user can quickly view prompt information corresponding to the interaction mode he/she wants to adopt, and the user experience is improved.

In some embodiments, if the operation instruction is invalid, each kind of operation prompt information is displayed in a scrolling manner. When the operation instruction is invalid, the controller is further configured to perform the following operations S35 and S36.

S35, in response to the time difference being greater than the time threshold, obtaining operation prompt information corresponding to each interaction mode for operating the input control in response to the start instruction of the input control.

S36, generating target operation prompt information based on the operation prompt information corresponding to the each interaction mode.

The time difference between the initial time when the operation instruction is received and the current time when the start instruction of the input control is received is calculated, the time difference is compared with the time threshold (which may be set at 120 minutes), if the time difference is greater than the time threshold, it is indicated that the user does not invoke the input control within 120 minutes, then it is determined that the operation instruction generated during interacting with the display apparatus in a certain interaction mode is invalid.

When the operation instruction is invalid, the controller is configured to, in response to the start instruction of the input control, not obtain the target operation prompt information corresponding to the target interaction mode, but obtains the operation prompt information corresponding to each interaction mode configured in the controller instead. For example, if three modes for operating an input control are configured in the controller, operation prompt information corresponding to the three interaction modes is obtained.

The operation prompt information corresponding to each interaction mode is taken as target operation prompt information, and the target operation prompt information includes the operation prompt information corresponding to each interaction mode.

Figure 10:
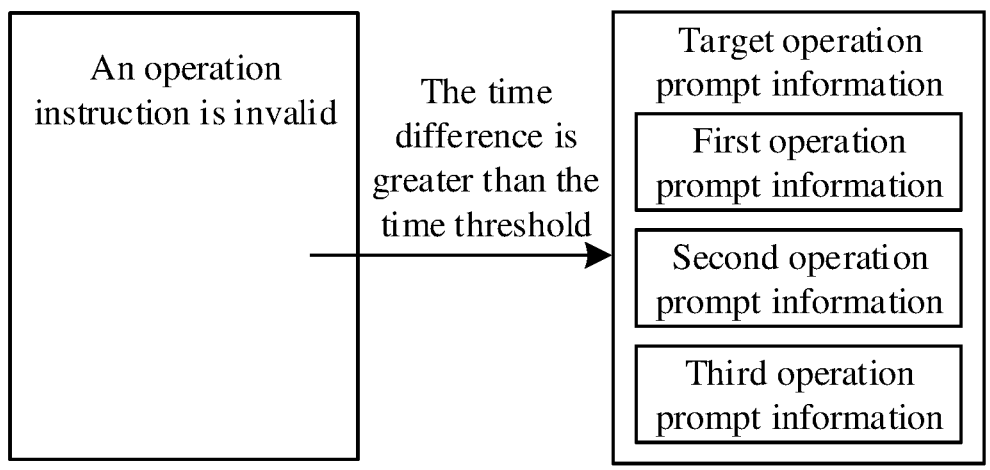
FIG. 10 shows a second schematic diagram of obtaining target operation prompt information according to some embodiments of the present application.

FIG. 10 illustrates a second schematic diagram of obtaining target operation prompt information according to some embodiments of the present application. Referring to FIG. 10, for example, if three modes for operating an input control are preset within the controller: a remote control key mode, a voice mode and a touch mode. The first operation prompt information corresponding to the remote control key mode is "press the direction key and the OK key on the remote control, you could input letters, numbers and characters"; the second operation prompt information corresponding to the voice mode is "speak, you could input letters, numbers and characters"; the third operation prompt information corresponding to the touch mode is "touch on the screen, you could input letters, numbers and characters".

Then the generated target operation prompt information includes the first operation prompt information corresponding to the remote control key mode, the second operation prompt information corresponding to the voice mode, and the third operation prompt information corresponding to the touch mode, i.e., including "press the direction key and the OK key on the remote control, you could input letters, numbers and characters"; "speak, you could input letters, numbers and characters"; "touch on the screen, you could input letters, numbers and characters".

As can be seen, when an operation instruction generated during interacting with the display apparatus in a target interaction mode is invalid (the time difference is greater than the time threshold), target operation prompt information corresponding to each interaction mode is obtained, and when the target operation prompt information is displayed, prompt information corresponding to each corresponding interaction mode is presented on the display in a scrolling manner, for facilitating viewing for the user and avoiding tedious display, and the user can quickly obtain prompt information corresponding to the interaction mode he/she wants to adopt, and the user experience is improved.

S4, generating an input box on the user interface, and displaying the target operation prompt information in the input box.

When the input control is invoked in the target interaction mode, an input box is generated while starting the input control, and the input box is presented on the user interface as an operation prompt box for the input control. To this end, target operation prompt information for operating the input control may be displayed in the input box.

The target operation prompt information presented in the input box is related to a determination result of whether an operation instruction generated during interacting with the display apparatus in a certain interaction mode is invalid when the input control is invoked, and the target operation prompt information displayed in the input box differs depending on the determination result about whether different operation instructions are invalid.

In some embodiments, when an operation instruction generated during interacting with the display apparatus in a target interaction mode is not invalid (the time difference is less than or equal to the time threshold), target operation prompt information corresponding to this particular target interaction mode can be obtained, in this case, the target operation prompt information only includes prompt information corresponding to one interaction mode, and the operation prompt information corresponding to this interaction mode may be displayed in the input box.

Figure 11:
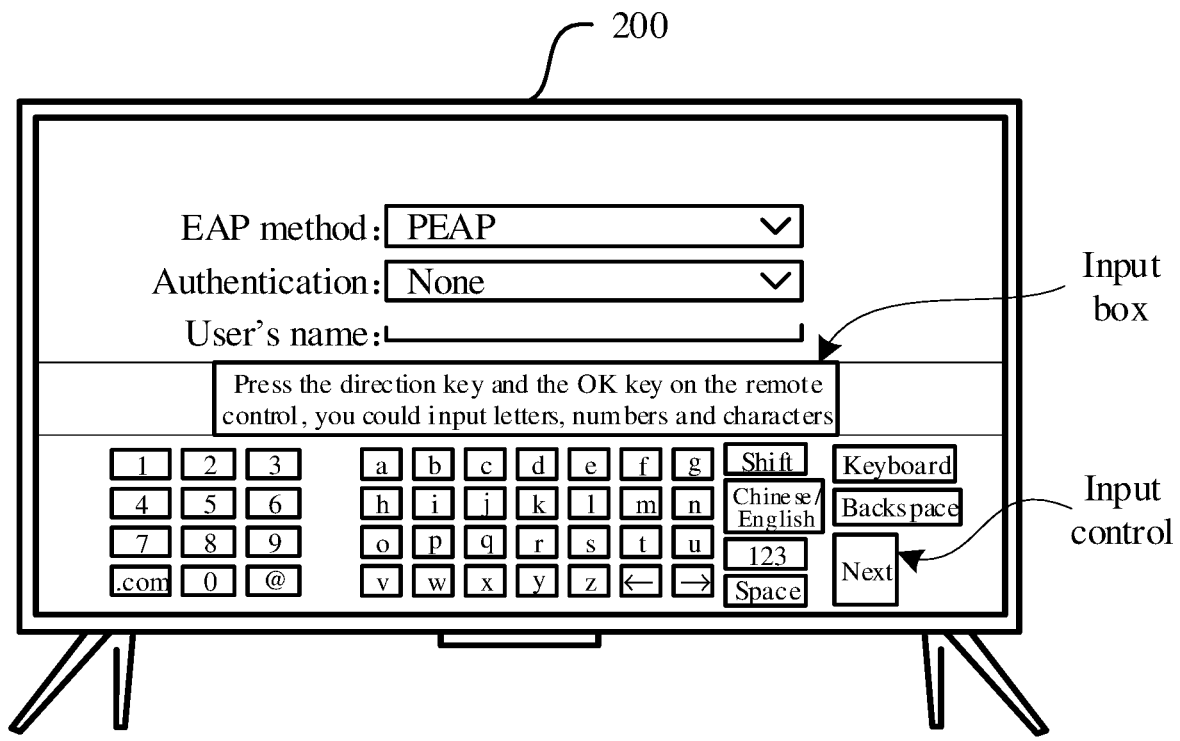
FIG. 11 shows a schematic diagram of displaying operation prompt information in a remote control interaction mode in an input box according to some embodiments of the present application.

FIG. 11 illustrates a schematic diagram of displaying operation prompt information corresponding to a remote control key mode in an input box according to some embodiments of the present application. For example, referring to FIG. 11, if an operation instruction generated during interacting with the display apparatus in a remote control key mode is not invalid, target operation prompt information corresponding to the remote control key mode is obtained, that is, first operation prompt information for operating the input control in the remote control key mode is obtained, operation content of the first operation prompt information is displayed in the input box, and the content presented in the input box may be "press the direction key and the OK key on the remote control, you cloud input letters, numbers and characters".

Figure 12:
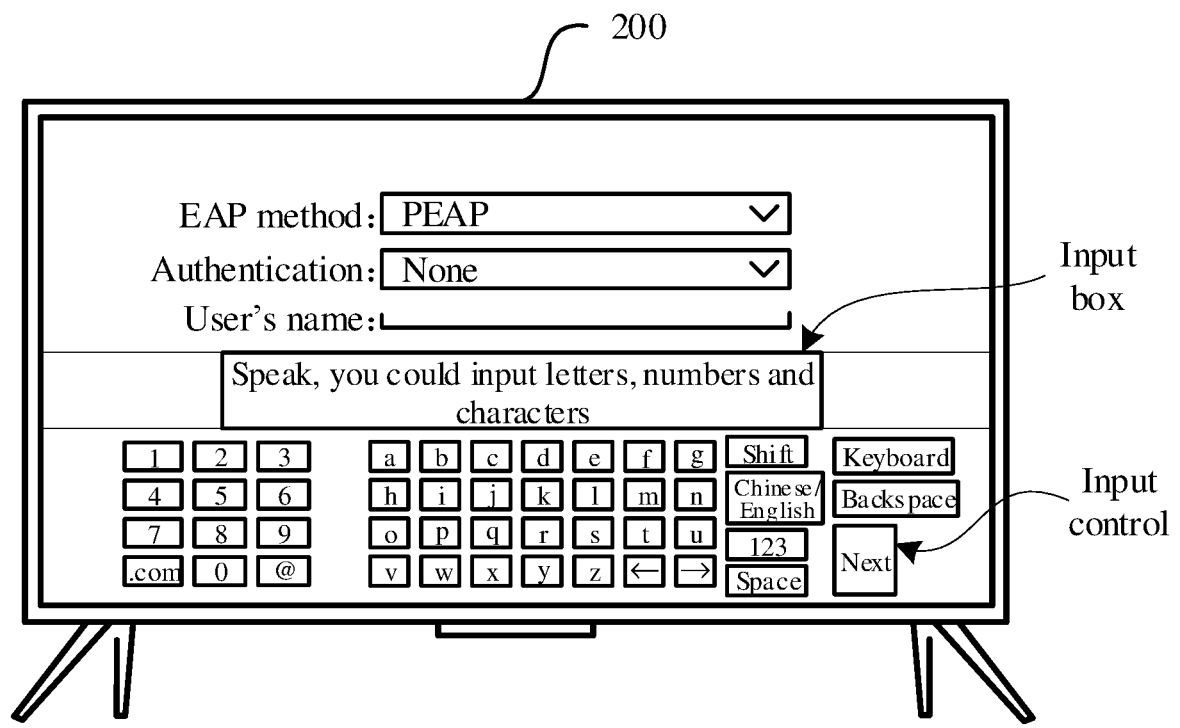
FIG. 12 shows a schematic diagram of displaying operation prompt information in a voice interaction mode in an input box according to some embodiments of the present application.

FIG. 12 illustrates a schematic diagram of displaying operation prompt information corresponding to a voice mode in an input box according to some embodiments of the present application. For example, referring to FIG. 12, if an operation instruction generated during interacting with the display apparatus in a Bluetooth voice mode is not invalid, target operation prompt information corresponding to the voice mode is obtained, that is, second operation prompt information for operating the input control in the voice mode is obtained, operation content of the second operation prompt information is displayed in the input box, and the content displayed in the input box may be "speak, you could input letters, numbers and characters".

Figure 13:
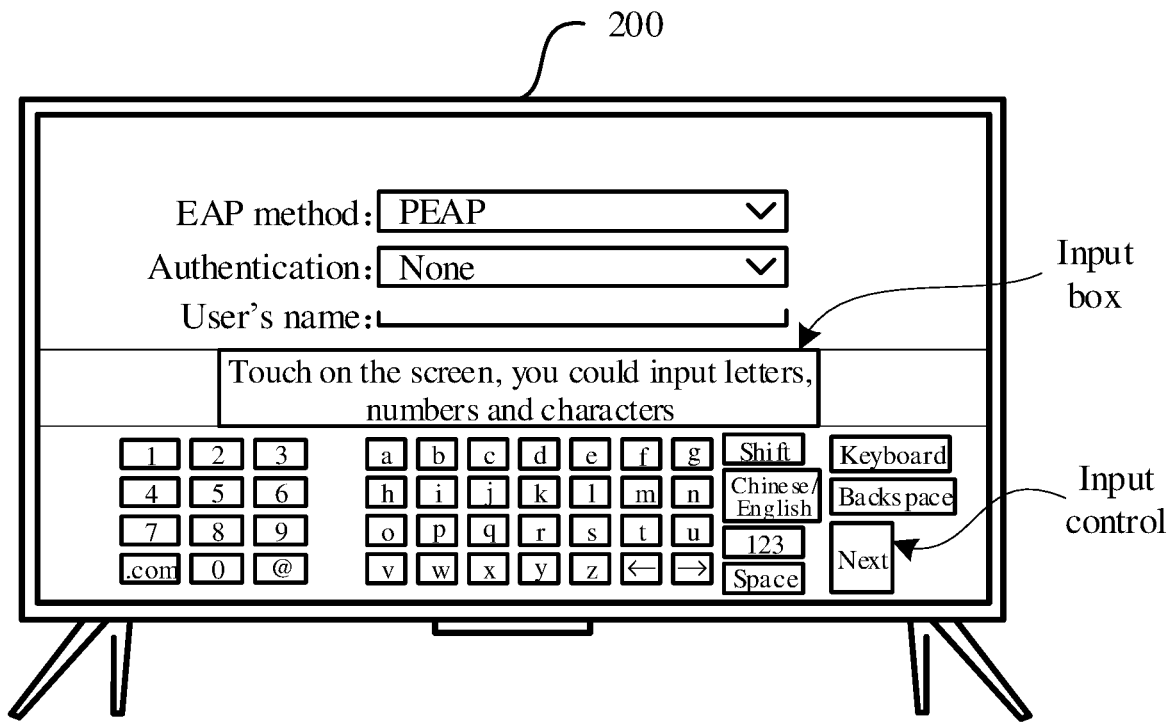
FIG. 13 shows a schematic diagram of displaying operation prompt information in a touch interaction mode in an input box according to some embodiments of the present application.

FIG. 13 illustrates a schematic diagram of displaying operation prompt information corresponding to a touch mode in an input box according to some embodiments of the present application. For example, referring to FIG. 13, if an operation instruction generated during interacting with the display apparatus in a touch mode is not invalid, target operation prompt information corresponding to the touch mode is obtained, that is, third operation prompt information for operating the input control in the touch mode is obtained, operation content of the third operation prompt information is displayed in the input box, and the content displayed in the input box may be "touch on the screen, you could input letters, numbers and characters".

The three exemplary embodiments described above illustrate an example scenario in which target operation prompt information is displayed in an input box when an operation instruction generated during interacting with a display apparatus in a target interaction mode is not invalid.

In some embodiments, when an operation instruction generated during a user's interaction with the display apparatus in a target interaction mode is invalid (the time difference is greater than the time threshold), target operation prompt information corresponding to each interaction mode is obtained, in this case, the target operation prompt information includes target operation prompt information corresponding to each interaction mode, and the target operation prompt information corresponding to each interaction mode may take turns displaying in the input box in scrolling manner.

In order to display the target operation prompt information in the input box in a scrolling display manner, the controller, when performing the step of displaying the target operation prompt information in the input box, is further configured to perform the operations S41 and S42.

S41, generating a scrolling display bar in the input box, wherein the scrolling display bar is configured to scroll up or scroll down to display a plurality pieces of operation prompt information at a preset speed alternatively.

S42, displaying the operation prompt information corresponding to the each interaction mode alternatively and automatically scrolling up or scrolling down by presenting the operation prompt information corresponding to the each interaction mode in the scrolling display bar.

In order to implement a display, the scrolling display bar is generated in the input box, and includes a plurality of display areas, and each display area is configured to display a piece of operation prompt information. The number of display areas included in the scrolling display bar is the same as the number of modes for operating an input control, such that operation prompt information corresponding to each interaction mode can be displayed.

The plurality of display areas in the scrolling display bar are arranged in an order from top to bottom, and each display area is scrolled at a preset speed, and the scrolling direction may be up or down. For example, if the scrolling display bar includes three display areas, then the ordering of the three display areas is a first display area, a second display area, and a third display area. If the scrolling direction is upward, the first display area is first displayed, and then scrolled at a preset speed, the second display area is then displayed, and scrolled up again, and the third display area is finally displayed, and scrolled up again, then the first display area is displayed again, and the display is cyclically performed in this order.

Each display area of the scrolling display bar displays one kind of operation prompt information, and the operation prompt information corresponding to each interaction mode in the target operation prompt information is displayed in the scrolling display bar. During each scrolling, the scrolling display bar only displays one display area, and each display area is scrolled at a preset speed, so as to realize scrolling display of the operation prompt information corresponding to each interaction mode.

Figure 14:
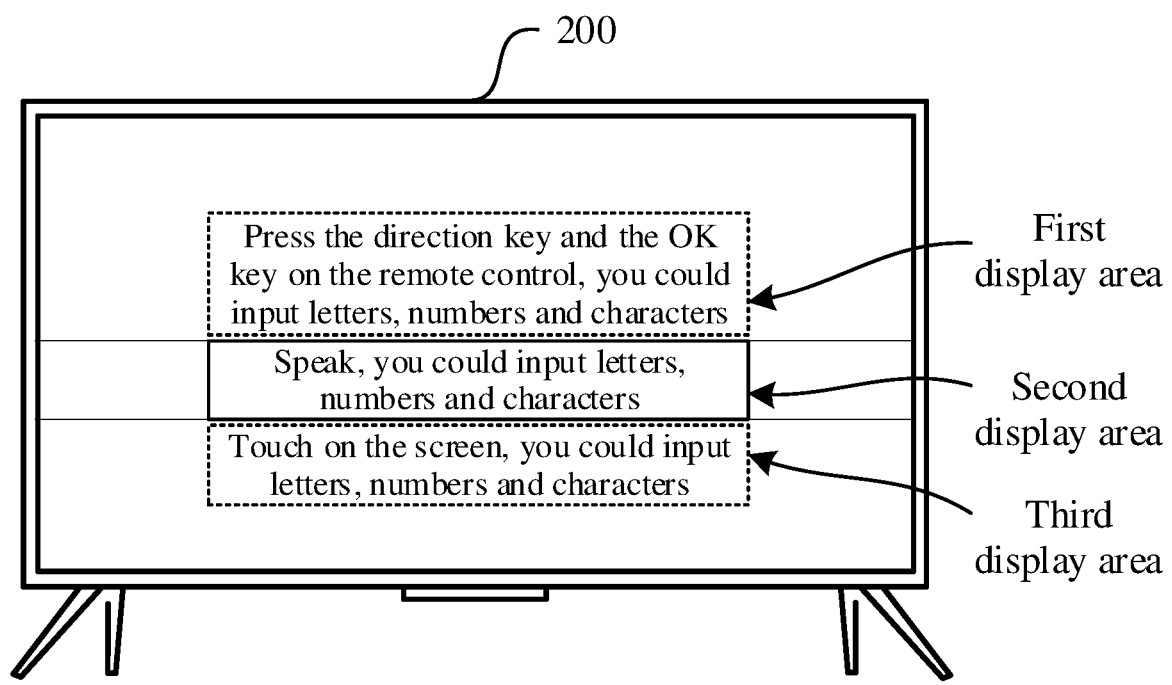
FIG. 14 shows a display schematic diagram of a scrolling display bar according to some embodiments of the present application.

FIG. 14 illustrates a display schematic diagram of a scrolling display bar according to some embodiments of the present application. Referring to FIG. 14, if the scrolling display bar includes three display areas, and modes for operating the input control include a remote control key mode, a voice mode and a touch mode, then the first display area displays operation prompt information corresponding to the remote control key mode, the second display area displays operation prompt information corresponding to the voice mode, and the third display area displays operation prompt information corresponding to the touch mode.

An scrolling up manner is adopted when the scrolling is performed, the content of the first display area is first displayed in the input box, that is, operation prompt information corresponding to the remote control key mode is displayed; when the scrolling display bar is scrolled up once at a preset speed, content of the second display area is displayed in the input box, that is, operation prompt information corresponding to the voice mode is displayed; when the scrolling display bar is scrolled up twice at a preset speed, content of the third display area is displayed in the input box, that is, operation prompt information corresponding to the touch mode is displayed; when the scrolling display bar is scrolled up three times at a preset speed, content of the first display area is displayed in the input box again, and the scrolling display of the operation prompt information corresponding to each interaction mode in the input box according to this cyclic process.

It is noted that the currently displayed content is content in a solid-line box, the scrolled content and the to-be-scrolled content are content in a dot-line box, and the state shown in FIG. 14 is a scenario where the second display area is displaying operation prompt information corresponding to the voice mode. In an application, the content of the dotted box is not displayed for viewing of the user, only the content of the solid-line box is displayed for viewing of the user, and the content of the dotted box in FIG. 14 is merely to display the scrolling order of the various display areas, not to illustrate the case where the three display areas are displayed simultaneously.

As can be seen, when an operation instruction generated during a user's interaction with the display apparatus in a target interaction mode is invalid (the time difference is greater than the time threshold), although operation prompt information corresponding to a particular interaction mode cannot be obtained, the display apparatus according to embodiments of the present disclosure can display operation prompt information corresponding to all modes for operating an input control in the input box in a scrolling manner, and this display manner facilitates viewing for the user and avoids tedious display, and the user can quickly obtain prompt information corresponding to the interaction mode he/she wants to adopt, and the user experience is good.

It can be seen from the above that according to the display apparatus provided by embodiments of the present disclosure, when operation prompt information for an input control is displayed, a controller obtains an operation instruction generated during a user's interaction with the display apparatus and determines a target interaction mode for operating the input control, obtains, in response to a start instruction of the input control generated based on invoking of the input control in the target interaction mode, target operation prompt information, and generates an input box on a user interface, and displays the target operation prompt information in the input box. It can be seen that the display apparatus provided by embodiments of the present disclosure determines a specific mode for operating an input control by identifying a specific interaction mode in which a user interacts with the display apparatus, and displays corresponding operation prompt information in the input box, thus avoiding the display of redundant and burdensome operation prompt information, the user viewing efficiency can be effectively improved, the user can quickly obtain prompt information corresponding to the interaction mode he/she wants to adopt, and the experience of user input interaction is further improved.

FIG. 7 illustrates a flowchart of a display method for operation prompt information of an input control according to some embodiments of the present application. The display method can be performed by a display apparatus. The display apparatus includes a display, a remote controller, Bluetooth circuits and a controller. The display is configured to present video obtained via broadcast or Internet and a user interface. The remote controller includes a plurality of keys. The Bluetooth circuits are configured to communicate with outside according to a Bluetooth protocol. The controller is in connection with the display, the remote controller and the Bluetooth circuits.

Referring to FIG. 7, the display method for operation prompt information of an input control is performed by the controller configured in the display apparatus according to the above embodiments of the present disclosure and includes the operations S1 to S4.

S1, obtaining an operation instruction from a user, during a user's interaction with the display apparatus.

S2, in response to the operation instruction, determining a target interaction mode for the user's interaction with the display apparatus. In some embodiments, the target interaction mode includes a first interaction mode based on the remote controller and a second interaction mode based on the Bluetooth circuits.

S3, in response to a start instruction of an input control generated by invoking of the input control in the target interaction mode, obtaining target operation prompt information for the input control, wherein the target operation prompt information is configured to prompt target operation content for operating the input control.

S4, generating an input box on the user interface and displaying the target operation prompt information in the input box. The input box is a control generated when the input control is started, and is configured to display operation prompt information.

In some embodiments of the present application, the target interaction mode further includes a third interaction mode based on a touch control.

In some embodiments of the present application, the method further includes: storing the operation instruction and recording a start time when the operation instruction is obtained by the display apparatus, wherein the start time is configured to determine whether the operation instruction is invalid.

In some embodiments of the present disclosure, obtaining the target operation prompt information, includes: obtaining a first time (e.g., current time) when the start instruction of the input control is received and the start time when the operation instruction is obtained; calculating a time difference between the start time and the first time; and in response to the time difference being less than or equal to a time threshold, obtaining the target operation prompt information corresponding to the target interaction mode in response to the start instruction of the input control.

In some embodiments of the present disclosure, obtaining the target operation prompt information, further includes: receiving the start instruction of the input control generated by invoking of the input control in the target interaction mode.

In some embodiments of the present application, the method further includes: in response to the time difference being greater than the time threshold, obtaining operation prompt information corresponding to a plurality of interaction modes for operating the input control in response to the start instruction of the input control; and generating the target operation prompt information based on the operation prompt information corresponding to the plurality of interaction modes.

In some embodiments of the present application, the target operation prompt information includes operation prompt information for the first interaction mode.

In some embodiments of the present application, the target operation prompt information includes operation prompt information for the second interaction mode.

In some embodiments of the present application, the target prompt information corresponding to the plurality of interaction modes includes first prompt information for the first interaction mode, second prompt information for the second interaction mode and third prompt information for the third interaction mode.

In some embodiments of the present application, the displaying the target operation prompt information in the input box, includes: generating a scrolling display bar in the input box, wherein the scrolling display bar is configured to sequentially display the first prompt information, the second prompt information and the third prompt information at a preset speed; and displaying the first prompt information, the second prompt information and the third prompt information in the scrolling display bar alternatively, where prompt information in the scrolling display bar is visibly different from presentation of other prompt information.

In some embodiments of the present application, the method further includes: switching display of the first prompt information, the second prompt information and the third prompt information in the scrolling display bar by scrolling up or scrolling down.

The same and similar parts among the embodiments in the description can be referred to each other.

For convenience of explanation, the above description is discussed in combination with specific embodiments. However, the exemplary discussions above are not intended to be exhaustive or to limit implementations to the specific forms of the above disclosure. Many modifications and variations can be obtained according to the above teaching. The selection and description of the above embodiments is to better explain the principles and practical applications, so that those skilled in the art can better use the embodiments and various variant embodiments.

What is claimed is:

1. A display apparatus, comprising:
   a display, configured to present a user interface;
   Bluetooth circuits configured to communicate with outside according to a Bluetooth protocol; and
   at least one processor, in connection with the display, the Bluetooth circuits and a remote controller comprising a plurality of keys, and configured to:
   during a user's interaction with the display apparatus, obtain an operation instruction from a user;
   in response to the operation instruction, determine a target interaction mode for the user's interaction with the display apparatus, wherein the target interaction mode comprises a first interaction mode based on the remote controller and a second interaction mode based on the Bluetooth circuits;
   in response to a start instruction of an input control generated by invoking of the input control in the target interaction mode, obtain target operation prompt information for the input control, wherein the target operation prompt information is configured to prompt target operation content for operating the input control; and
   generate an input box on the user interface and display the target operation prompt information in the input box;
   wherein the at least one processor is further configured to:
   store the operation instruction and record a start time when the operation instruction is obtained by the display apparatus, wherein the start time is configured to determine whether the operation instruction is invalid;
   obtain a first time when the start instruction of the input control is received and the start time when the operation instruction is obtained;
   calculate a time difference between the start time and the first time; and
   in response to the time difference being greater than a time threshold, obtain operation prompt information corresponding to a plurality of interaction modes for operating the input control in response to the start instruction of the input control; and
   generate the target operation prompt information based on the operation prompt information corresponding to the plurality of interaction modes.

2. The display apparatus according to claim 1, wherein the target interaction mode further comprises a third interaction mode based on a touch control.

3. The display apparatus according to claim 1, wherein the at least one processor is further configured to:
   in response to the time difference being less than or equal to the time threshold, obtain the target operation prompt information corresponding to the target interaction mode in response to the start instruction of the input control.

4. The display apparatus according to claim 1, wherein the target operation prompt information comprises operation prompt information for the first interaction mode.

5. The display apparatus according to claim 1, wherein the target operation prompt information comprises operation prompt information for the second interaction mode.

6. The display apparatus according to claim 1, wherein the target prompt information corresponding to the plurality of interaction modes comprises first prompt information for the first interaction mode, second prompt information for the second interaction mode and third prompt information for a third interaction mode.

7. The display apparatus according to claim 6, wherein the at least one processor is further configured to:
   generate a scrolling display bar in the input box, wherein the scrolling display bar is configured to sequentially display the first prompt information, the second prompt information and the third prompt information at a preset speed; and
   display the first prompt information, the second prompt information and the third prompt information in the scrolling display bar alternatively, wherein prompt information in the scrolling display bar is visibly different from presentation of other prompt information.

8. The display apparatus according to claim 7, wherein the at least one processor is further configured to:
   switch display of the first prompt information, the second prompt information and the third prompt information in the scrolling display bar by scrolling up or scrolling down.

9. A display method for a display apparatus, and comprising: during a user's interaction with the display apparatus, obtaining an operation instruction from a user, wherein the display apparatus comprises Bluetooth circuits configured to communicate with outside according to a Bluetooth protocol and is in connection with a remote controller comprising a plurality of keys;

in response to the operation instruction, determining a target interaction mode for the user's interaction with the display apparatus, wherein the target interaction mode comprises a first interaction mode based on the remote controller and a second interaction mode based on the Bluetooth circuits;

in response to a start instruction of an input control generated by invoking of the input control in the target interaction mode, obtaining target operation prompt information for the input control, wherein the target operation prompt information is configured to prompt target operation content for operating the input control;

generating an input box on the user interface and display the target operation prompt information in the input box;

storing the operation instruction and record a start time when the operation instruction is obtained by the display apparatus, wherein the start time is configured to determine whether the operation instruction is invalid;

obtaining a first time when the start instruction of the input control is received and the start time when the operation instruction is obtained;

calculating a time difference between the start time and the first time;

in response to the time difference being greater than a time threshold, obtaining operation prompt information corresponding to a plurality of interaction modes for operating the input control in response to the start instruction of the input control; and generating the target operation prompt information based on the operation prompt information corresponding to the plurality of interaction modes.

10. The display method according to claim 9, wherein the target interaction mode further comprises a third interaction mode based on a touch control.

11. The display method according to claim 9, further comprising:

in response to the time difference being less than or equal to the time threshold, obtaining the target operation prompt information corresponding to the target interaction mode in response to the start instruction of the input control.

12. The display method according to claim 9, wherein the target operation prompt information comprises operation prompt information for the first interaction mode.

13. The display method according to claim 9, wherein the target operation prompt information comprises operation prompt information for the second interaction mode.

14. The display method according to claim 9, wherein the target prompt information corresponding to the plurality of interaction modes comprises first prompt information for the first interaction mode, second prompt information for the second interaction mode and third prompt information for a third interaction mode.

15. The display method according to claim 14, further comprising: generating a scrolling display bar in the input box, wherein the scrolling display bar is configured to sequentially display the first prompt information, the second prompt information and the third prompt information at a preset speed; and displaying the first prompt information, the second prompt information and the third prompt information in the scrolling display bar alternatively, wherein prompt information in the scrolling display bar is visibly different from presentation of other prompt information.

16. The display method according to claim 15, further comprising: switching display of the first prompt information, the second prompt information and the third prompt information in the scrolling display bar by scrolling up or scrolling down.

* * * * *